No. 622,226. W. C. HOMAN. Patented Apr. 4, 1899.
BRACKET.
(Application filed Oct. 28, 1898.)

(No Model.)

WITNESSES
James F. Duhamel.
Emmons D. Newell

INVENTOR,
William C. Homan,
BY
R C Mitchell
ATTORNEY

THE NORRIS PETERS CO., PHOTO-LITHO., WASHINGTON, D. C.

UNITED STATES PATENT OFFICE.

WILLIAM C. HOMAN, OF MERIDEN, CONNECTICUT, ASSIGNOR TO THE EDWARD MILLER & COMPANY, OF CONNECTICUT.

BRACKET.

SPECIFICATION forming part of Letters Patent No. 622,226, dated April 4, 1899.

Application filed October 28, 1898. Serial No. 694,795. (No model.)

*To all whom it may concern:*

Be it known that I, WILLIAM C. HOMAN, a citizen of the United States, residing at Meriden, New Haven county, Connecticut, have invented certain new and useful Improvements in Brackets, of which the following is a full, clear, and exact description.

The object of my invention is to provide an improvement in brackets, and particularly those for use in connection with vehicle-lamps.

Figure 1:
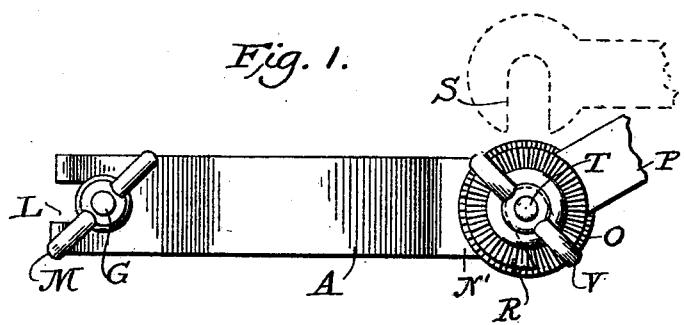
Figure 2:
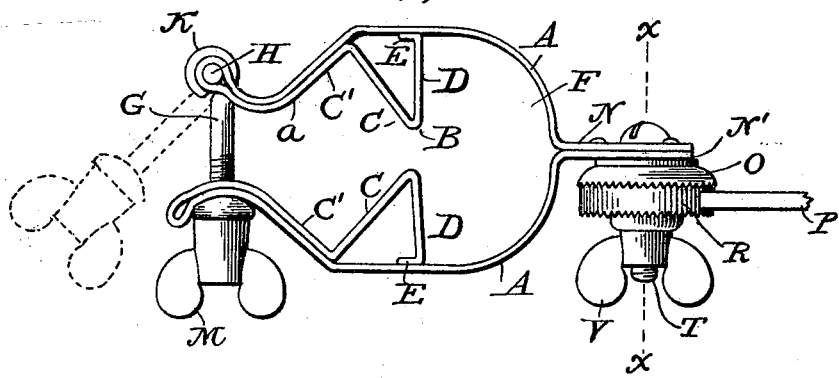
Figure 3:
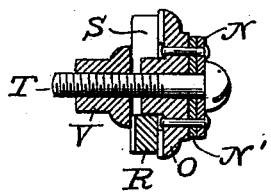

In the preferred embodiment of my invention shown in the drawings, Figure 1 shows a side elevation of my invention, one part thereof being shown in dotted lines to more particularly illustrate a detail. Fig. 2 is a plan view of Fig. 1. Fig. 3 is a section of Fig. 2 on the line X X.

Referring to the drawings, A represents one of preferably a pair of rearwardly-extending arms. B represents an angular inward projection formed in this embodiment, of sheet metal, and preferably attached to the bent arm at E. C is a bearing-face formed by one side of said projection, and D is a leg which, it will be observed, serves to brace the bearing face or plate C. This projection is preferably formed by bending back the end $a$ of the arm A and forming the projection as shown. A space F is left between this projection and one bent—in the present embodiment the curved—end of the arm A. G is a locking-bolt pivoted to one of said arms by the pin H and eye K. L is a slot in the opposite member, into which this bolt is adapted to pass, and M is a wing-nut on the end of the threaded bolt to draw the members together. The two similar faces C C and the faces C' C' form an opening which is adapted to clasp the head of the bicycle or other analogous vehicle, while the space F serves to permit the brake-rod to move laterally therein without hindrance.

The two arms in this embodiment are provided with projections N N', to which is fastened a member O, which is preferably corrugated by radial grooves, as shown, to form projections and depressions. P is an arm to which a lamp may be attached, carried by a member R, which member has a bearing-face which is also preferably corrugated by radial grooves forming projections and depressions. This part R is slotted preferably from the center through its outer edge, as shown in dotted lines, Fig. 1, at S. A threaded bolt T projects from one member—in this embodiment the member O—and on the end thereof is a wing-nut V. The member R is adapted to be placed against the member O with the two bearing-faces in contact, the projections of the one fitting into the depressions of the other, and said members can then be drawn together by screwing up the nut V. It will be observed that the slot S in the member R allows the two members to be placed in their operative relation to each other without taking off the wing-nut V.

It will be obvious that many modifications of the device herein shown may be made without departing from the spirit of my invention.

What I claim is—

1. In a lamp-bracket in combination, a pair of arms lying in substantially the same plane, one of said arms formed of a narrow strip of sheet metal bent outward away from said other arm and then inward toward said arm then reversely bent upon itself and outward and again inward to form a set of bearing-faces, and a screw and nut attached to the ends of said arms to draw the same together, said bearing-faces coöperating with said other arm to form a clamp.

2. In a lamp-bracket in combination, a pair of arms formed of sheet metal attached together at one end and then bent in opposite directions and then bent toward each other and each then reversely bent back upon itself and outward away from each other, then inward toward each other to form two sets of bearing-faces, and the end of each arm then bent outward to form a brace, and a screw and nut for said arms to draw the same together.

Signed at Meriden, Connecticut, this 25th day of October, 1898.

WILLIAM C. HOMAN.

Witnesses:
 ALFRED DUNLOP,
 CHAS. E. HOMAN.